(12) United States Patent
Kim

(10) Patent No.: US 8,919,749 B2
(45) Date of Patent: Dec. 30, 2014

(54) PARALLEL TYPE ENGINE MOUNT STRUCTURE

(71) Applicant: Hyundai Motor Company, Seoul (KR)

(72) Inventor: Seung Won Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 170 days.

(21) Appl. No.: 13/773,043

(22) Filed: Feb. 21, 2013

(65) Prior Publication Data

US 2014/0159291 A1 Jun. 12, 2014

(30) Foreign Application Priority Data

Dec. 7, 2012 (KR) .......................... 10-2012-0141912

(51) Int. Cl.
    *F16F 13/00* (2006.01)
    *F16F 13/10* (2006.01)
    *F16F 13/26* (2006.01)

(52) U.S. Cl.
    CPC ................. *F16F 13/10* (2013.01); *F16F 13/26* (2013.01)
    USPC .................................................. 267/140.14

(58) Field of Classification Search
    USPC ................. 267/140.13–140.15, 219; 248/569
    See application file for complete search history.

(56) References Cited

U.S. PATENT DOCUMENTS

| 5,386,977 A | 2/1995 | Quast |
| 8,573,569 B2 * | 11/2013 | Hasegawa et al. ........ 267/140.14 |
| 2002/0053764 A1 * | 5/2002 | Goto et al. ................ 267/140.14 |
| 2008/0007125 A1 * | 1/2008 | Koyama et al. .......... 267/140.14 |

FOREIGN PATENT DOCUMENTS

| EP | 0595591 A1 | 5/1994 |
| JP | 06-016050 A | 1/1994 |
| JP | H06137363 A | 5/1994 |
| KR | 10-0507172 | 8/2005 |
| KR | 10-2005-0107988 | 11/2005 |
| KR | 10-0525480 | 11/2005 |

* cited by examiner

*Primary Examiner* — Melanie Torres Williams
(74) *Attorney, Agent, or Firm* — Edwards Wildman Palmer LLP; Peter F. Corless

(57) ABSTRACT

Disclosed is a parallel type engine mount structure that includes a main rubber member having a core disposed at an upper portion thereof and a fluid chamber disposed at a lower portion thereof. A bracket is disposed at an exterior of the main rubber member and a membrane is mounted at a lower portion of the fluid chamber. Additionally, a first space is disposed at a lower portion of the membrane on which one end of a first leaf spring is mounted. An orifice is disposed at an exterior side of the first space and includes an upper liquid chamber formed between the main rubber member and the membrane and a lower liquid chamber. A driver is disposed at an exterior side of the bracket and includes a second space formed at a lower portion thereof and a second leaf spring connected to the first leaf spring.

7 Claims, 7 Drawing Sheets

PARALLEL TYPE ENGINE MOUNT STRUCTURE

CROSS-REFERENCE TO RELATED APPLICATION

This application is based on and claims priority from Korean Patent Application No. 10-2012-0141912, filed on Dec. 7, 2012 in the Korean Intellectual Property Office, the disclosure of which is incorporated herein in its entirety by reference.

BACKGROUND OF THE INVENTION

1. Field of the invention

The present invention relates to a parallel type engine mount structure, and more particularly, to a parallel type engine mount structure for minimizing a height of an engine mount by separating a driver mounted in the engine mount.

2. Description of the Prior Art

Generally, a vehicle is installed with an engine mount for a power train to support the power train and to prevent vibration generated in the power train from being transferred to a vehicle body. In addition, the engine mount for a power train supporting an engine and a transmission also effectively decreases vibration and noise generated from the engine.

FIGS. 1 and 2 are exemplary cross-sectional views showing an engine mount structure according to the related art.

The engine mount structure according to the related art includes a main bridge 10 having a core 11 formed therein and made of a rubber material and a bolt 20 inserted into the core 11 of the main bridge 10 and connected to an engine side, as shown in FIG. 1.

The engine mount structure according to the related art as described above absorbs vibration of an engine only in the main bridge 10 into which the bolt 20 is inserted, thereby enduring a power train load and decreasing vibration through a single main bridge 10.

In addition, the engine mount structure according to the related art includes a driver disposed at a lower portion of the engine mount 1 to allow a current to flow according to a change in pressure due to the generation of the vibration, to form a magnetic field around a coil to generate force and adjust internal pressure of the engine mount 1, thereby decreasing vibration of a vehicle, as shown in FIG. 2.

However, since the engine mount structure includes the driver mounted at a lower end of the engine mount, the size of the engine mount increases, thereby making it substantially difficult to maintain a degree of freedom in a layout and increase space utilization to decrease a coupling property of a frame.

SUMMARY

The present invention provides a parallel type engine mount structure for minimizing a height of an engine mount by separating a driver mounted in the engine mount.

According to an exemplary embodiment of the present invention, a parallel type engine mount structure may include: a main rubber member including a core disposed on an upper portion thereof and a fluid chamber disposed at a lower portion thereof; a bracket having a housing shape and disposed on an exterior portion of the main rubber member; a membrane mounted at a lower portion of the fluid chamber of the main rubber member to decrease vibration; a first space disposed at a lower portion of the membrane; a first leaf spring having one end mounted on the membrane and the other end positioned at the first space; an orifice including an upper liquid chamber having a nozzle inlet structure and formed between the main rubber member and the membrane and a lower liquid chamber having a nozzle outlet structure and disposed at an exterior side of the first space; and a driver disposed at one end of an exterior side of the bracket and including a second space formed at a lower portion thereof and a second leaf spring disposed in the second space and connected to the first leaf spring.

Furthermore, the driver may be an electromagnet. The second leaf spring may include a vibration plate formed upwardly, and the driver may further include an armature formed therein in communication with the vibration plate. In addition, the parallel type engine mount structure may further include a connection rod connecting the first and second leaf springs to each other. The first and second spaces may have the connection rod positioned therein and may be separated from the upper and lower liquid chambers sealed in a mount to allow gas to be formed therein. Moreover, the first and second leaf springs may have a semicircle shape, wherein the semicircle has a closed spherical part formed in a direction toward an exterior side of the driver.

BRIEF DESCRIPTION OF THE DRAWINGS

The above and other objects, features and advantages of the present invention will be more apparent from the following detailed description taken in conjunction with the accompanying drawings, in which.

DESCRIPTION OF THE EXEMPLARY EMBODIMENTS

Figure 1:
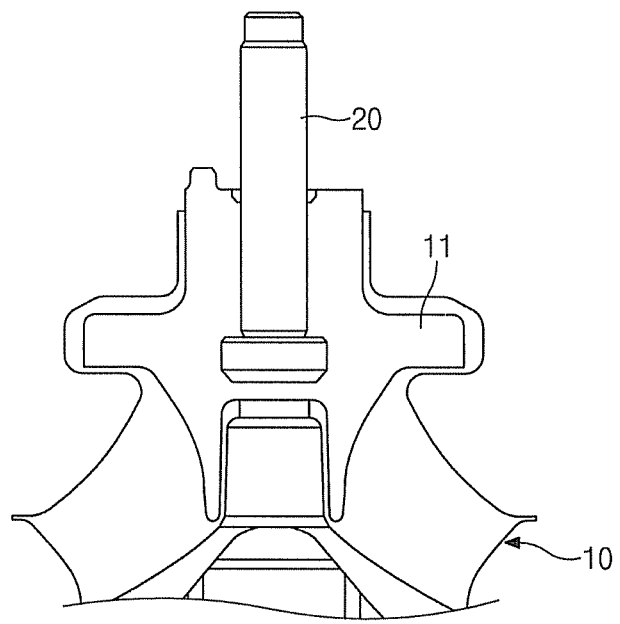
FIGS. 1 and 2 are exemplary views showing an engine mount structure according to the related art.
Figure 2:
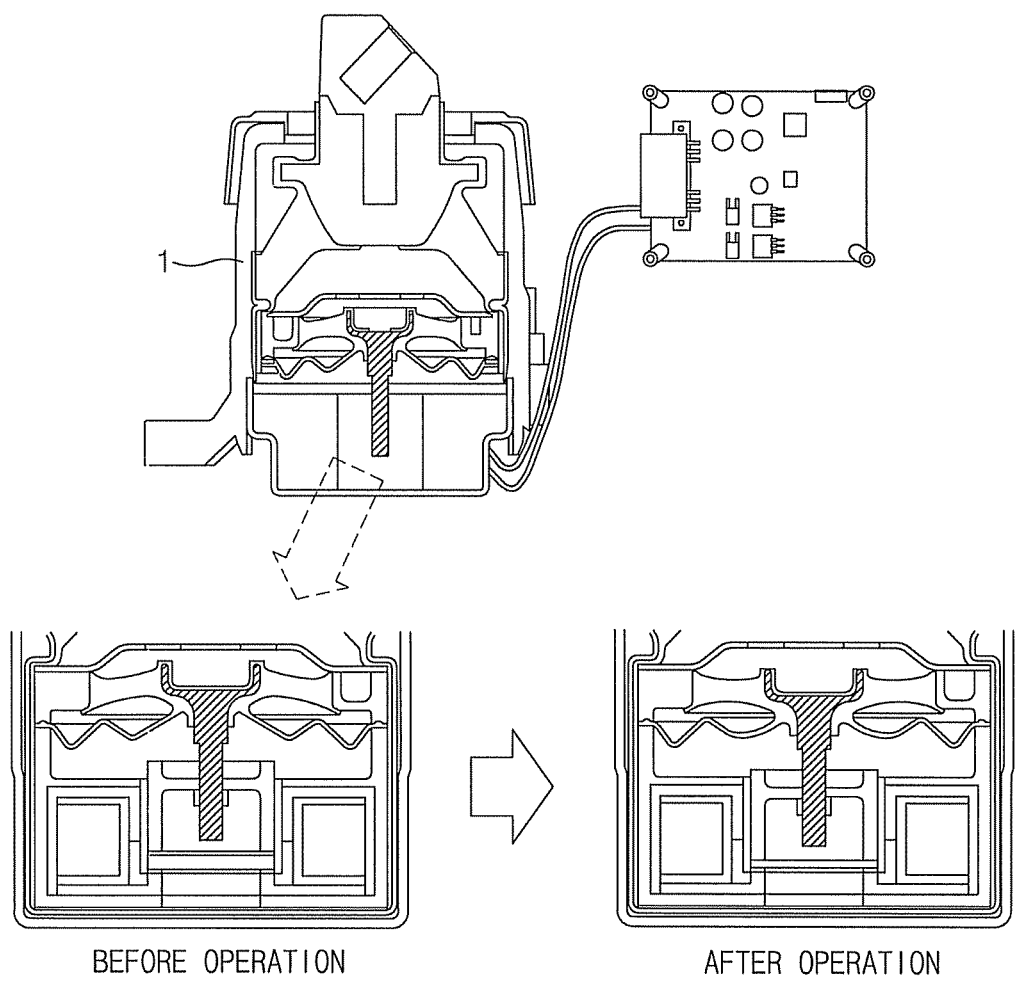

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Exemplary embodiments of the present invention will be described in detail with reference to the accompanying drawings.

A parallel type engine mount structure according to an exemplary embodiment of the present invention may include a main rubber member 100 including a core 110 and a fluid chamber 120, a bracket 130 forming an exterior side of the main rubber member 100, a membrane 140 disposed at a lower portion of the fluid chamber 120, a first space 141 disposed at a lower portion of the membrane 140, a first leaf spring 142 connected to the membrane 140, an orifice 150 including an upper liquid chamber 151 and a lower liquid chamber 152, and a driver 200 including a second space 210 formed at a lower portion thereof and a second leaf spring 220 disposed in the second space 210, as shown in FIGS. 3 to 7.

The main rubber member 100 may be made of a rubber material and disposed on an exterior side of the core 110. Furthermore, a lower portion of the main rubber member 100 may include the fluid chamber 120 to enable a decrease in vibration of the engine mount. Additionally, the bracket 130 may be disposed on an exterior portion of the main rubber member 100 and may have a housing shape to form an appearance of the engine mount. The membrane 140, configured to decrease the vibration of the engine mount, may be mounted at the lower portion of the fluid chamber 120 of the main rubber member 100.

Moreover, the first space 141 may be disposed at the lower portion of the membrane 140 to enable movement of gas. The first leaf spring 142, configured to linearly move the membrane 140 in a horizontal direction to decrease the vibration, may have one end mounted on the membrane 140 and the other end positioned at the first space 141 to move in the horizontal direction according to the movement of the gas.

Figure 7:
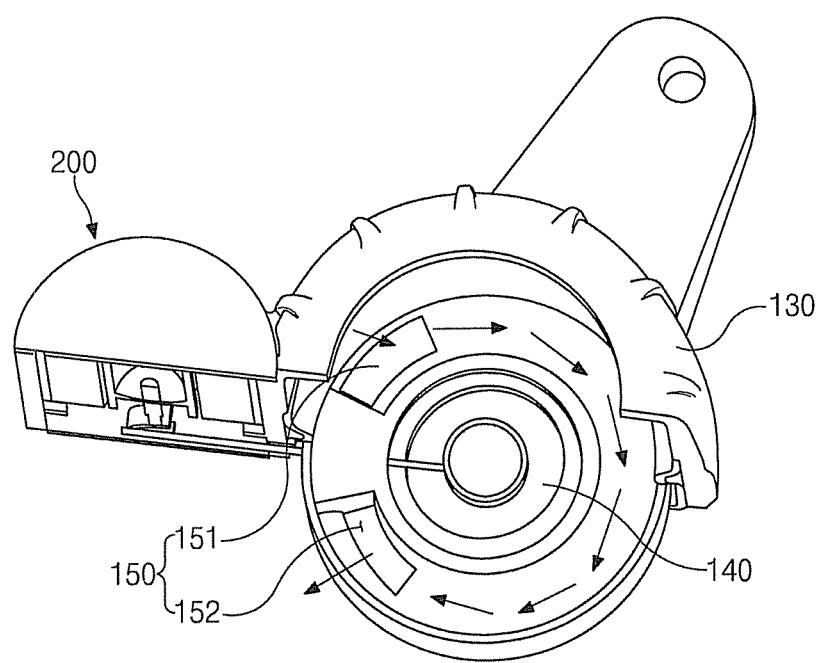
FIG. 7 is an exemplary view showing a flow of a fluid in the parallel type engine mount structure according to the exemplary embodiment of the present invention.

Furthermore, the orifice 150 may include the upper liquid chamber 151 having a nozzle inlet structure and formed between the main rubber member 100 and the membrane 140 and the lower liquid chamber 152 having a nozzle outlet structure and disposed at an exterior side of the first space 141. As a result, as shown in FIG. 7, a fluid may flow toward the upper liquid chamber 151 and the lower liquid chamber 152 through a circular ring shaped path connecting the upper liquid chamber 151 and the lower liquid chamber 152. In addition, the orifice 150 may be disposed at one side of the first space 141 and may interlock with the first space 141 to enable the movement of the gas in the engine mount.

The driver 200 may be disposed at one end of an exterior side of the bracket 130 to decrease the vibration of the engine mount after the decrease in the vibration of the membrane 140. Moreover, the lower portion of the driver 200 may include the second space 210 in communication with the first space 141, wherein the second space 210 may include the second leaf spring 220 connected to the first leaf spring 142, wherein the second leaf spring 220 is operated by the operation of the first leaf spring 142 through the movement of the gas.

Figure 3:
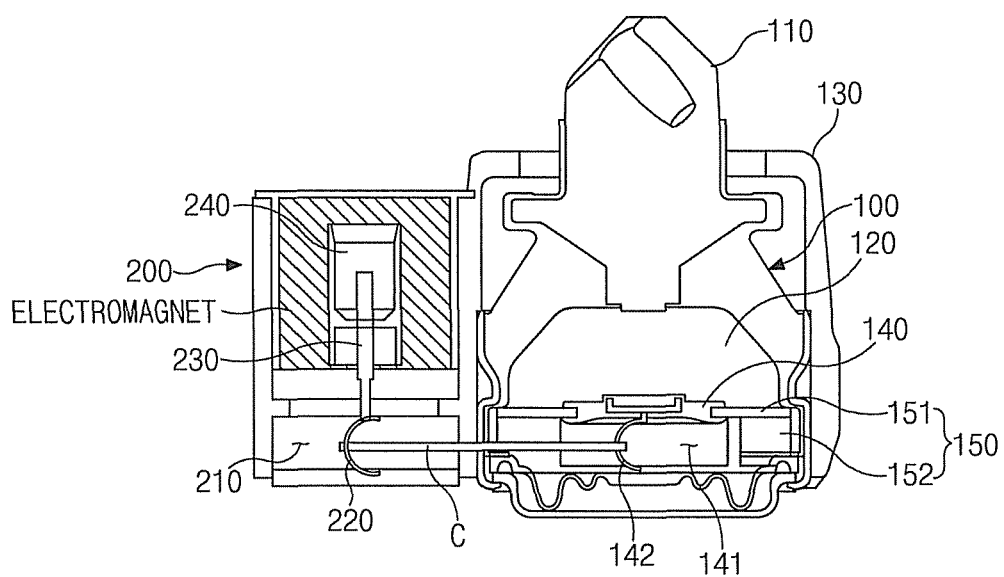
FIG. 3 is an exemplary cross-sectional view showing a parallel type engine mount structure according to an exemplary embodiment of the present invention.
Figure 4:
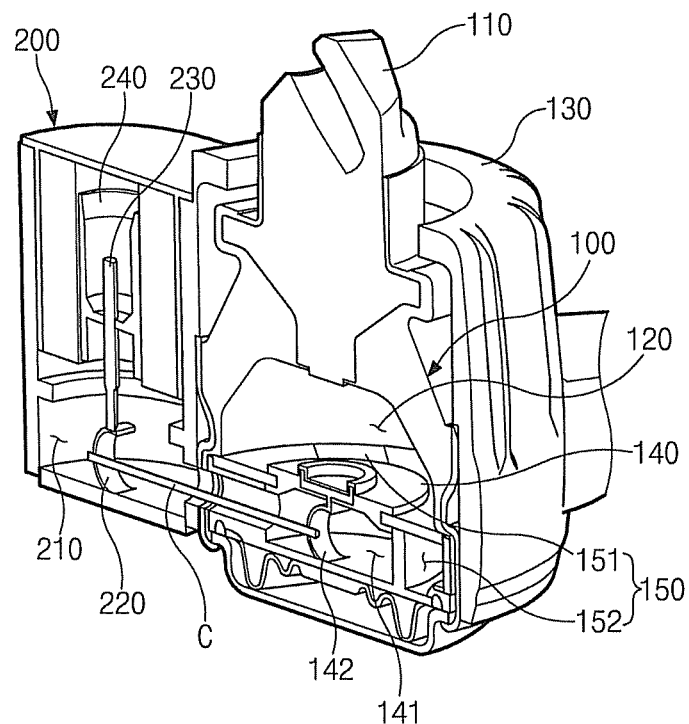
FIG. 4 is an exemplary view showing the parallel type engine mount structure according to the exemplary embodiment of the present invention.

The first leaf spring 142 and the second leaf spring 220 may be connected through a connection rod C, as shown in FIG. 3. Additionally, the first space 141 and the second space 210 may be separated from the upper and lower liquid chambers 151 and 152 sealed in the mount to allow the gas to be formed in the first space 141 in which the first leaf spring 142 and the connection rod C are connected and the second space 210 in which the second leaf spring 220 and the connection rod C are connected.

Meanwhile, the driver 200 may be formed of an electromagnet and may include a vibration plate 230 formed at a top portion of the second leaf spring 220 and an armature 240 formed around the vibration plate 230. Therefore, when the driver 200 formed of the electromagnet is operated when vibration is generated, the armature 240 and the vibration plate 230 communicate to move the second leaf spring 220, thereby decreasing the vibration.

As described above, according to the exemplary embodiment of the present invention, the driver 200 may be mounted on the exterior side of the bracket 130 to form the parallel type engine mount, thereby minimizing a height of the engine mount. In addition, the bracket 130 and the driver 200 may include the first leaf spring 142 and the second leaf spring 220, respectively, to decrease the vibration of the engine mount.

Moreover, an operation principle of the parallel type engine mount structure according to the exemplary embodiment of the present invention will be described below.

Figure 5:
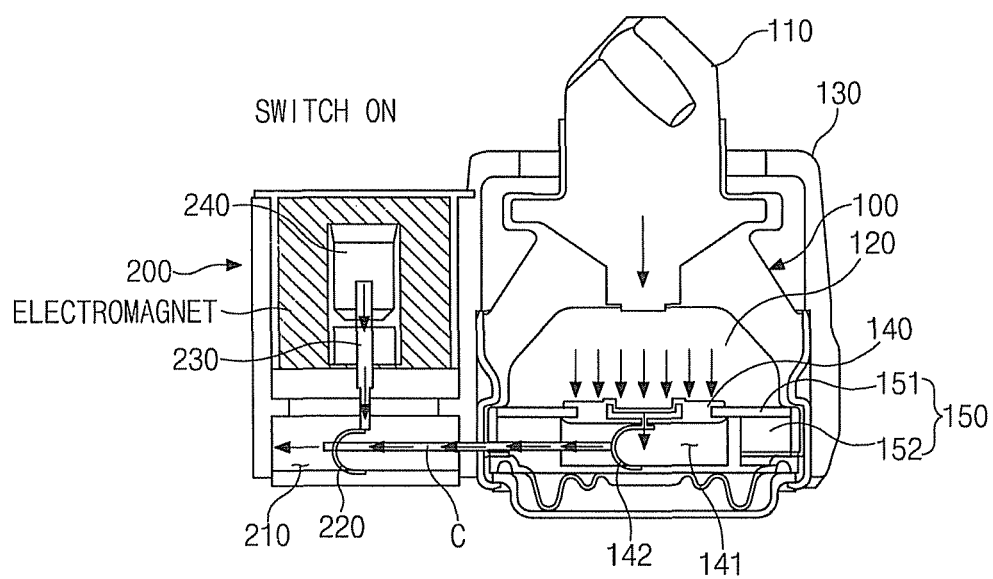
FIG. 5 is an exemplary cross-sectional view showing a state in which a driver of the parallel type engine mount structure is turned on according to the exemplary embodiment of the present invention.

When power is applied to the engine mount, as shown in FIG. 5, the membrane 140 may be pulled horizontally, such that pressure in the first space 141 is raised. As a result, the first leaf spring 142 may compress while being moved leftward, thereby pushing the first leaf spring 142 and the membrane 140 downwardly. Furthermore, due to the operation of the first leaf spring 142, the second leaf spring 220 may compress by force transferred through the connection rod C and force transferred through the vibration plate 230, thereby moving a central axis of the second leaf spring 220 leftward to pull the connection rod C.

Figure 6:
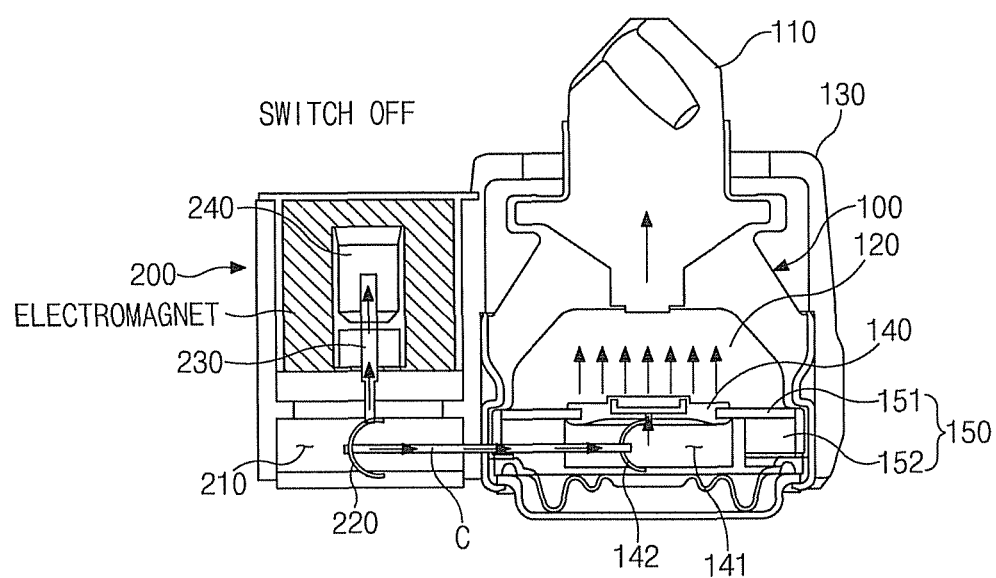
FIG. 6 is an exemplary cross-sectional view showing a state in which the driver of the parallel type engine mount structure is turned off according to the exemplary embodiment of the present invention.

Meanwhile, when the power is turned off, as shown in FIG. 6, the membrane 140 may return to an original position by elasticity, thereby decreasing the pressure in the first space 141. In addition, the electromagnet may not operated, thereby returning the first leaf spring 142, the second leaf spring 220, and the membrane 140 to original positions.

As a result, according to the exemplary embodiment of the present invention, since linear movement of the driver 200 may be continuously maintained, noise and vibration may not be generated. In addition, since the connection rod C connecting the first and second leaf springs 142 and 220 linearly reciprocates in a length direction, the connection rod C may not bend. Further, when a central portion of the first leaf spring 142 connected to the membrane 140 is pulled horizontally, since only vertical reciprocation occurs in the first leaf spring 142, the pressure may decrease, thereby decreasing the vibration.

As described above, according to the exemplary embodiment of the present invention, the bracket 130 and the driver 200 may be disposed in a horizontal position, thereby minimizing the size of the engine mount. In addition, in a state in which the driver 200 is turned on as shown in FIG. 5, a current may flow in the electromagnet to move the first and second leaf springs 142 and 220, thereby decreasing the vibration. In addition, in a state in which the driver 200 is turned off as shown in FIG. 6, the current flowing in the electromagnet may be blocked, to allow the first and second leaf springs 142 and 220 to return to original positions.

According to the exemplary embodiment of the present invention as described above, the driver may be used in a state in which the driver is separated from the engine mount to minimize a height of the engine mount, thereby maintaining a degree of freedom in a layout and improving space utilization. Furthermore, the leaf springs may be operated in the engine mount and the driver, thereby making decreasing vibration generation. In addition, when the driver is not used, the vibration may be decreased through the membrane, thereby increasing marketability.

As described above, although the present invention has been described with reference to exemplary embodiments and the accompanying drawings, it would be appreciated by those skilled in the art that the present invention is not limited thereto but various modifications and alterations might be made without departing from the scope defined in the following claims.

What is claimed is:

1. A parallel type engine mount structure comprising:
   a main rubber member including a core disposed at an upper portion of the main rubber member and a fluid chamber disposed at a lower portion of the main rubber member;
   a bracket having a housing shape and disposed at an exterior portion of the main rubber member;
   a membrane mounted at a lower portion of the fluid chamber of the main rubber member to decrease vibration;
   a first space disposed at a lower portion of the membrane;
   a first leaf spring having one end mounted on the membrane and the other end positioned at the first space;
   an orifice including an upper liquid chamber having a nozzle inlet structure and formed between the main rubber member and the membrane and a lower liquid chamber having a nozzle outlet structure and disposed at an exterior side of the first space; and
   a driver disposed at one end of an exterior side of the bracket and including a second space formed at a lower portion of the driver and a second leaf spring disposed in the second space and connected to the first leaf spring.

2. The parallel type engine mount structure of claim 1, wherein the driver is an electromagnet.

3. The parallel type engine mount structure of claim 1, wherein the second leaf spring includes a vibration plate formed upwardly.

4. The parallel type engine mount structure of claim 3, wherein the driver further includes:
   an armature formed within the driver to communicate with the vibration plate.

5. The parallel type engine mount structure of claim 1, further comprising:
   a connection rod connecting the first and second leaf springs.

6. The parallel type engine mount structure of claim 5, wherein the first and second spaces have the connection rod positioned therein and are separated from the upper and lower liquid chambers sealed in a mount to allow gas to be formed therein.

7. The parallel type engine mount structure of claim 1, wherein the first and second leaf springs have a semicircle shape, the semicircle having a closed spherical part formed in a direction toward an exterior side of the driver.

* * * * *